(12) United States Patent
Tan et al.

(10) Patent No.: US 7,881,470 B2
(45) Date of Patent: Feb. 1, 2011

(54) NETWORK MOBILITY SECURITY MANAGEMENT

(75) Inventors: Tat Kin Tan, Penang (MY); Lee Booi Lim, Penang (MY); Sy Jong Choi, Penang (MY)

(73) Assignee: Intel Corporation, Santa Clara, CA (US)

( * ) Notice: Subject to any disclaimer, the term of this patent is extended or adjusted under 35 U.S.C. 154(b) by 1024 days.

(21) Appl. No.: 11/371,594

(22) Filed: Mar. 9, 2006

(65) Prior Publication Data
US 2007/0211900 A1 Sep. 13, 2007

(51) Int. Cl.
*H04L 9/00* (2006.01)
*H04L 9/08* (2006.01)
*H04L 9/32* (2006.01)
*H04W 36/00* (2009.01)

(52) U.S. Cl. ............... 380/255; 380/259; 380/260; 380/270; 380/272; 380/277; 380/282; 713/150; 713/155; 713/165; 713/167; 713/168; 455/403; 455/432.1; 455/433; 455/435.1; 455/436; 455/439; 455/442

(58) Field of Classification Search ............... 713/150, 713/155–159, 164–168; 380/255, 259, 260, 380/270–272, 277, 282–285; 455/403, 432.1, 455/433, 435.1, 436–442
See application file for complete search history.

(56) References Cited

U.S. PATENT DOCUMENTS

| 6,836,765 | B1 * | 12/2004 | Sussman ............... 705/75 |
| 7,174,018 | B1 * | 2/2007 | Patil et al. ............... 380/258 |
| 2001/0047407 | A1 * | 11/2001 | Moore et al. ............... 709/223 |
| 2003/0196084 | A1 * | 10/2003 | Okereke et al. ............... 713/156 |
| 2004/0117653 | A1 * | 6/2004 | Shapira et al. ............... 713/201 |
| 2005/0055576 | A1 * | 3/2005 | Mononen et al. ............... 713/201 |
| 2005/0144439 | A1 * | 6/2005 | Park et al. ............... 713/155 |
| 2007/0006296 | A1 * | 1/2007 | Nakhjiri et al. ............... 726/15 |

* cited by examiner

*Primary Examiner*—Taghi T Arani
*Assistant Examiner*—Madhuri Herzog
(74) *Attorney, Agent, or Firm*—Blakely, Sokoloff, Taylor & Zafman LLP

(57) ABSTRACT

A node that couples to the Internet establishes a secure connection with another node that couples to the Internet. The secure connection to be established via an IPsec security association. The node registers with an authority that couples to the Internet and provides public key infrastructure (PKI) services. Registration is to include obtaining both a private and a public and key. The PKI services to include providing the private key to only the registered node and providing the public key to another registered node that requests PKI services from the authority. The node requests the PKI services from the authority based on a change in a point of attachment for the node to the Internet. The node then authenticates the other node via the PKI services and exchanges a secret key with the other node based on the authentication of the other node. The node is to implement an encryption scheme that uses the exchanged secret key for symmetric encryption of data exchanged between the node and the other node. The symmetric encryption is to maintain a secure connection between the nodes.

28 Claims, 5 Drawing Sheets

NETWORK MOBILITY SECURITY MANAGEMENT

BACKGROUND

In networking environments that include devices or nodes on a network coupled to the Internet, the nodes may move and/or become mobile (e.g., mobile network nodes "MNNs"). In this environment, maintaining a continuous network connection with these MNNs due to that movement is difficult. For example, an MNN utilizes Mobile Internet Protocol Version 6 (MIPv6) to communicate with another node on a network that couples to the Internet. In this example, the MNN moves such that its point of attachment to the Internet has changed and is different than its previous point of attachment. A point of attachment, for example, may be a link to an access point (wired or wireless) for a network that couples to the Internet. The network that couples to the Internet may include, but is not limited to, wired or wireless local area networks (LAN/WLAN), wide area networks (WAN/WWAN), metropolitan area networks (MAN), personal area networks (PAN) and cellular or wireless broadband telephony networks.

Typically, a network address (e.g., IPv4 or IPv6 address) is associated with the MNN's point of attachment to the Internet. When the MNN's point of attachment changes, another network address is associated with the MNN's new point of attachment to the Internet. This may result in a corresponding change in the MNN's network address. Simply changing the MNN's network address based on a change in the point of attachment may allow the MNN to communicate with another node uninterrupted, for example, at the Open Systems Interconnection (OSI) data link layer. However, the MNN may be a mobile handheld or notebook personal computer that has established higher layer connections (e.g., transport and higher levels) with another node. These higher layer connections (e.g., a virtual private network (VPN) connection) may be based on the MNN maintaining a specific network address. Due to authentication requirements, these higher layer connections between the MNN and the node likely cannot be maintained by just changing the network address.

Industry initiatives have tried to address a possible interruption in communications via higher level connections. These initiatives allow an MNN to move from one point of attachment to another without changing the address to which other nodes may forward data to the MNN. Thus, the MNN's network address from the perspective of other nodes has not changed. One such initiative is the Internet Engineering Task Force, Network Working Group, Request for Comments: 3775, Mobility Support in IPv6, published June 2004 ("RFC 3775"). RFC 3775 describes a MIPv6-based communication protocol that allows an MNN to move from one point of attachment to another without changing the network address some or most other nodes may use to communicate with that MNN. This is accomplished by giving the MNN a home address that is associated with its original or initial point of attachment to the Internet. This original or initial point of attachment is typically referred to as the home link. Other nodes will forward communications to a node (e.g., a router) on the home link using that home address associated with the home link. Communications are then forwarded to the MNN by the node on the home link. Thus, as the MNN moves to different points of attachment, that movement is transparent to higher layer connections with other nodes.

Another industry initiative addresses instances where an MNN is part of a network that also moves and/or becomes mobile ("mobile network"). One such initiative is the Internet Engineering Task Force, Network Working Group, Request for Comments: 3963, Network Mobility (NEMO) Basic Support Protocol, published January 2005 ("RFC 3963"). RFC 3963 describes a protocol that allows every node coupled to a mobile network to maintain communications with other nodes in or outside of the mobile network while the mobile network moves around and changes its point of attachment to the Internet. The mobile network may couple to the Internet through a node that is also mobile or becomes mobile and has routing capabilities, e.g., a mobile router. In that sense, the mobile network is commonly called a nested network when coupled to another router that is part of another network.

DETAILED DESCRIPTION

Figure 1A:
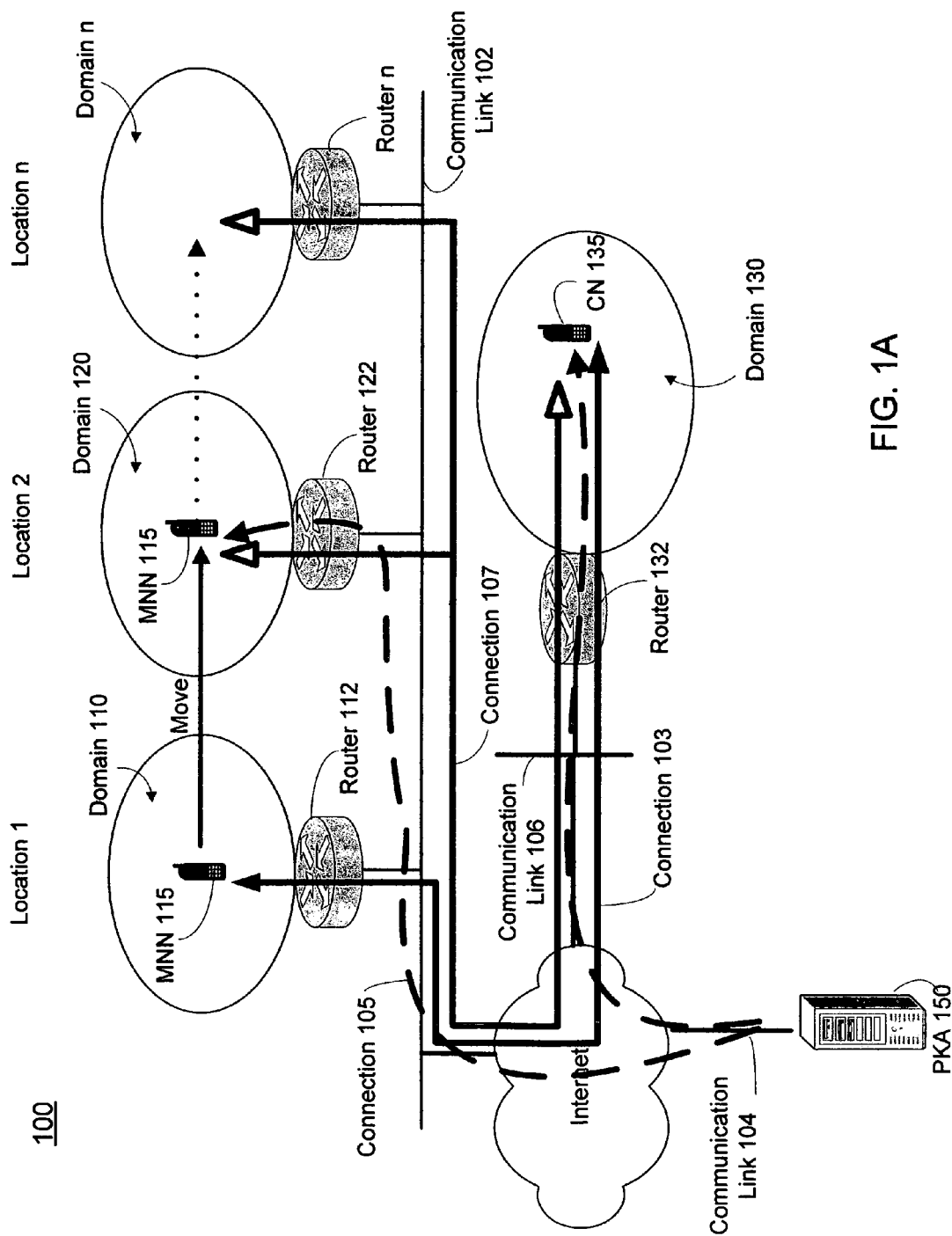
FIG. 1A is an example illustration of secure communication between a mobile network node and another node in a system.

As mentioned in the background, industry initiatives describe ways an MNN may remain mobile without changing its home address and a mobile network may move transparently to nodes within and outside of the mobile network. However, the freedom to move transparently increases the risk that sensitive or private information may be accessed, modified, or intercepted by an unauthorized party. These problems may be mitigated or reduced by setting up a secure connection between two nodes that wish to communicate.

One industry initiative that describes a way to establish secure connections for an Internet based network that uses Internet communication protocols (e.g., MIPv4 or MIPv6) is the Internet Engineering Task Force, Network Working Group, Request for Comments: 2401, Security Architecture for the Internet Protocol, published November 1998 ("IPSec"). Nodes that implement IPSec to establish a secure connection exchange data in the form of security policies that are part of a security association database (SAD). The SAD may contain, for instance, a list of encryption standards (e.g., Advanced Encryption Standard (AES), Data Encryption Standard (DES), Triple Data Encryption Standard (3DES), etc.) that are used with various encryption algorithms (e.g., Cipher Block Chaining (CBC), Counter Mode Encryption with CBC to Media Access Controller (MAC) authentication (CCM), Electronic Code Book (ECB), etc.).

In one example, establishing a secure connection via IPSec includes the nodes synchronizing each node's SAD. Typically, each possible encryption algorithm to be used with each possible encryption standard creates extremely large SADs for each node. Thus the process of synchronizing the SADs can use a large amount of node resources. Additionally, both RFC 3775 and RFC 3963 require a series of resource-intensive stages (e.g., registration, binding, binding updates, etc.) to maintain an IPSec-based, secure communication link.

In a NEMO environment, the resource intensiveness of maintaining an IpSec-based, secure communication link between an MNN and another node may negatively impact the performance of each node. This impact on performance may become acute as the MNN changes its point of attachment on a relatively frequent basis (e.g., several times in a few minutes). This acute impact is problematic to the MNN maintaining a secure connection with another node.

In one example, a node (e.g., an MNN) that couples to the Internet establishes a secure connection with another node that couples to the Internet. The secure connection to be established via an IPsec security association. The node registers with an authority that couples to the Internet and provides public key infrastructure (PKI) services. Registration to include obtaining both a private and a public key. The PKI services to include providing a private key to only the registered node and providing the public key to another registered node that requests PKI services from the authority. The node requests the PKI services from the authority based on a change in a point of attachment for the node to the Internet. The node then authenticates the other node via the PKI services and exchanges a secret key with the other node based on the authentication of the other node. The node implements an encryption scheme that uses the exchanged secret key for symmetric encryption of data exchanged between the node and the other node. The symmetric encryption to maintain a secure connection between the nodes.

FIG. 1A is an example illustration of secure communication between a mobile network node 115 and a correspondent node 135 in system 100. As depicted in FIG. 1A, system 100 includes communication links 102, 104 and 106 coupled to the Internet. These communication links, for example, include but are not limited to the wired and/or wireless pathways via which devices or nodes couple to the Internet. In one example, communication links 102, 104 and 106 are each part of a given network or a combination of given networks that couple to the Internet.

Although FIG. 1A depicts routers and telephony devices, nodes also include, but are not limited to, access points, two-way radio communication systems, one-way pagers, two-way pagers, personal communication systems, personal computers, personal digital assistants, digital broadband telephony device(s) and computing devices.

As shown in FIG. 1A, routers 112, 122 and any other number of routers n couple to the Internet via communication link 102 and router 132 couples via communication link 106. In one example, routers 112, 122 and 132 each include domains 110, 120 and 130, respectively. Additionally, router n is depicted in FIG. 1A as including a corresponding domain n. In this example, domain 110, 120, 130 and n indicate, via a network address, the point of attachment for a node that couples to the Internet through routers 112, 122, 132 or n.

In one example, a mobile network node (MNN) 115 has an original point of attachment via router 112. Thus, MNN 115 has a point of attachment in domain 110 as portrayed in FIG. 1A. In one implementation, MNN 115 uses MIPv6 communication protocols as described in RFC 3775. This disclosure is not limited to only MIPv6 communication protocols described in RFC 3775 but may include other types of mobile IP communication protocols (e.g., MIPv4) described in other industry initiatives or standards.

In one example, MNN 115 wishes to communicate via a secure connection to another node that is referred to as a correspondent node. In this implementation, the correspondent node is shown in FIG. 1 as CN 135. In other implementations, the correspondent node may be any node coupled to communication link 102, 104 or 106. As shown in FIG. 1A, CN 135 has a point of attachment via router 132 and has a network address within domain 130. As described above, one way to establish a secure connection between MNN 115 and CN 135 is to utilize IPSec as described in RFC 3963. This may include set-up of a bi-directional tunnel between MNN 115's and CN 135's point of attachment to the Internet (e.g., registration, binding updates, binding update acknowledgements, etc.). This may also include synchronization of each node's SAD. This secure connection is portrayed in FIG. 1A as secure connection 103.

As described in more detail below, both MNN 115 and CN 135 may register with an authority to provide public key infrastructure (PKI) services. This PKI authority is shown in FIG. 1A as PKA 150. In one example, PKA 150 is on a network that couples to the Internet. This network may be part of a larger network that interconnects elements in system 100 via a combination of communication links 102, 104 and 106 and the Internet. The larger network may be a WAN for an enterprise. Thus, in this example, PKA 150 is a PKI authority for that enterprise WAN. In another example, the larger network may be a subscription-based, Internet service provider (ISP) network that interconnects elements via a combination of communication links 102, 104 and 106. Thus, in this other example, PKA 150 is a PKI authority for that subscription-based ISP network. In both of the above examples, a PKI authority operates and/or provides services that may follow at least portions of one or more industry initiatives related to PKI. One such initiative is the Internet Engineering Task Force, Network Working Group, Request for Comments: 4210, Internet X.509 Public Key Infrastructure Certificate Management Protocol, published September 2005 ("RFC 4210"), although this disclosure is not limited to only this PKI related RFC.

In one implementation, MNN 115 moves to location 2. As a result, MNN 115 changes its point of attachment as portrayed in FIG. 1A from router 112 to router 122. This places MNN 115's network address within domain 120. Rather than reestablish or maintain the resource-intensive IPSec-based, secure connection for the new point of attachment in domain 120, MNN 115 requests the PKI services from PKA 150 to authenticate CN 135. CN 135 also makes a request to PKA 150 for PKI services to authenticate MNN 115. Requests for PKI services are made via connection 105.

In one example, based on each node authenticating each other, a secret key is exchanged. This secret key, for example, is known only by MN 115 and CN 135. An encryption scheme is implemented by MN 115 and CN 135 that uses the secret key for symmetric encryption of data exchanged between MN 115 and CN 135. The symmetric encryption to maintain a secure connection_between MNN 115 and CN 135. This secure connection is depicted in FIG. 1A as connection 107.

In one implementation, MNN 115 and CN 135 continue to implement the encryption scheme that uses the exchanged secret key for symmetric encryption of data exchanged between MNN 115 and CN 135. The symmetric encryption to maintain a secure connection even as MNN 115 changes its point of attachment to the Internet. For example, MNN 115 moves to a domain n that has a router n as its point of attachment. Since a secret key has already been exchanged, the two nodes maintain a secure communication via the symmetric encryption of data exchanged, between the nodes. If either MNN 115 or CN 135 determine that the secret key has become compromised (e.g., obtained by an unauthorized or unwanted entity) they may again request the PKI services from PKA 150 to re-authenticate the other node and exchange a new secret key.

In one example, MNN 115 may be a notebook personal computer used by a person riding a train. Router 112 may be located in a train station where the person first establishes a secure connection with CN 135. In this example, CN 135 may be a corporate server for a database the person is accessing via the connection between MNN 115 and CN 135. The secure connection may be established following IPSec protocols (e.g., as described in RFC 3775 and/or RFC 3963). When the train leaves the station, MNN 115's point of attachment may change to another router located in another train station.

In this example, MNN 115 and CN 135 have both registered with PKA 150 to provide PKI services. Thus, rather than maintain and/or reestablish the resource intensive IPSec-based, secure connection, MNN 115 makes a request to PKA 150 to provide the PKI services to authenticate CN 135. CN 135 may also place a request to PKA 150 to use the PKI services to authenticate MNN 115. Once the nodes have authenticated each other, they exchange a secret key and implement an encryption scheme that uses the secret key for symmetric encryption of data exchanged between MNN 115 and CN 135. The symmetric encryption to maintain a secure connection between MNN 115 and CN 135. Thus, as the train moves from train station to train station and MNN 115 possibly changes its point of attachment to the Internet multiple times, a secure connection is maintained with CN 135.

Figure 1B:
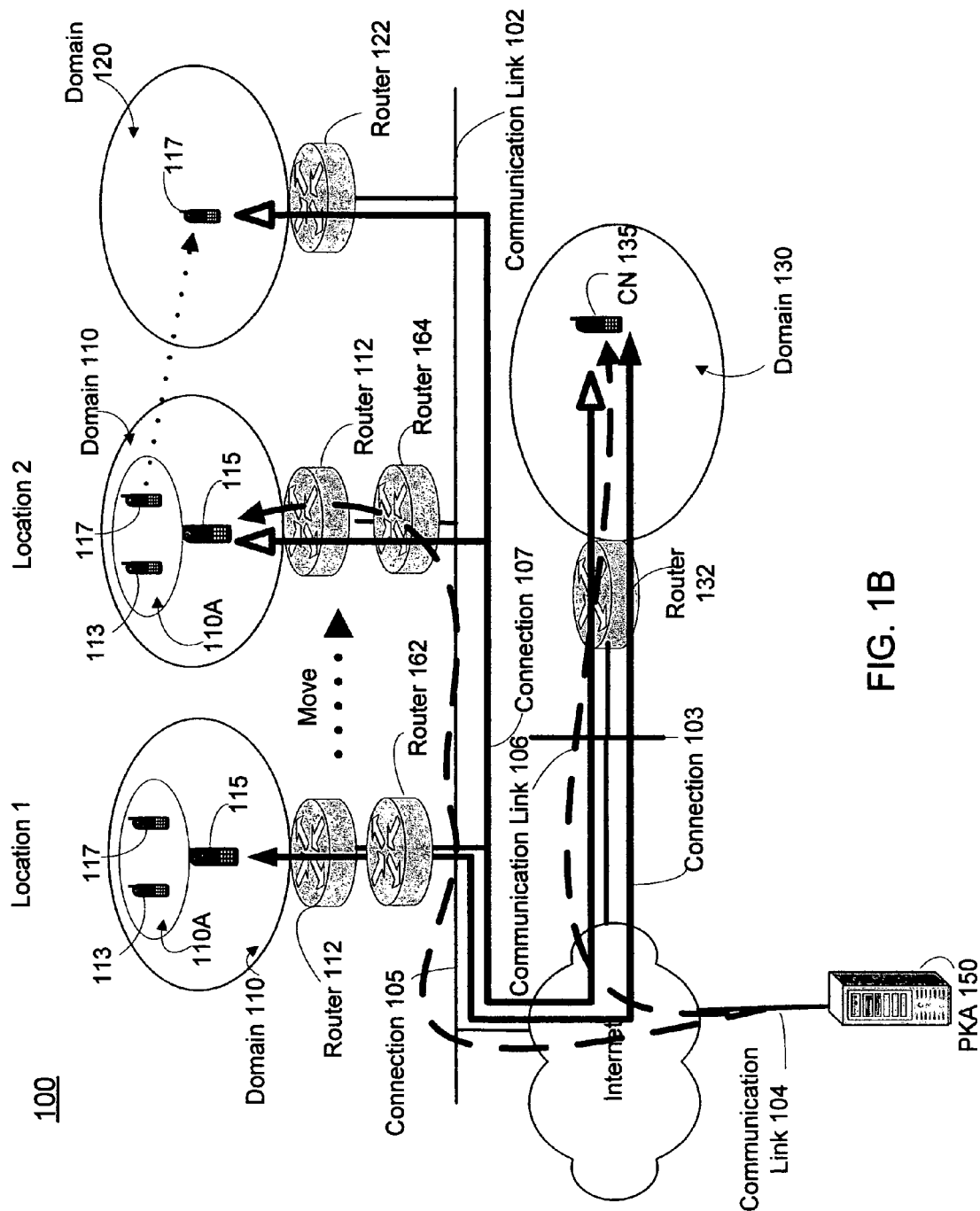
FIG. 1B is an example illustration of secure communication from a mobile network node in a nested mobile network in the system.

FIG. 1B is an example illustration of secure communication from an MNN 117 in an example nested mobile network 110A in system 100. As depicted in FIG. 1B, routers 162 and 164 are coupled to the Internet via communication link 102. In one example, router 112 is a router that is mobile or becomes mobile. As portrayed in FIG. 1B, router 112's point of attachment to the Internet is initially via router 162. Router 112's point of attachment becomes router 164 as router 112 moves from location 1 to location 2.

In one example, MNN 115 may have a point of attachment to the Internet via router 112. Two mobile network nodes portrayed as MNN 113 and 117 in FIG. 1B, for example, use MNN 115 as their point of attachment to the Internet. As a result, MNN 113 and MNN 117 couple to MNN 115 to form a nested mobile network 110A within domain 110. In one implementation, MNN 113 and MNN 117 do not change their point of attachment to the Internet as long as MNN 115's point of attachment remains router 112.

In one example, MNN 117 is a node that is capable of wirelessly attaching to the Internet. MNN 117 may base its point of attachment to the Internet on the most powerful or strongest wireless signal received from a node that is another point of attachment to the Internet. In this example, MNN 115 and routers 112, 122, 162 and 164 each include wireless capabilities to wirelessly attach another node to the Internet. Thus, in one implementation, as router 112 moves to location 2, MNN 117 receives or detects a more powerful wireless signal from router 122 than the signal it receives from MNN 115. Based on this more powerful wireless signal, MNN 117 changes its point of attachment to router 122 and thus moves out of mobile nested network 110A in domain 110 to domain 120.

In one example, MNN 117 has established a secure connection with CN 135 using IPSec. This is depicted as connection 103. Similar to what was described above to maintain a secure connection between MNN 115 and CN 135, MNN 117 and CN 135 may have registered with PKA 150 for PKA 150 to provide PKI services. Thus, based on MNN 117 changing its point of attachment to router 122, MNN 117 requests the PKI services from PKA 150 to authenticate CN 135 and following the authentication, exchanges a secret key. MNN 117 and CN135 may then implement an encryption scheme that uses the secret key for symmetric encryption of data exchanged between MNN 117 and CN 135. The symmetric encryption of data exchanged between MNN 117 and CN 135 to maintain a secure connection between the nodes.

Figure 2:
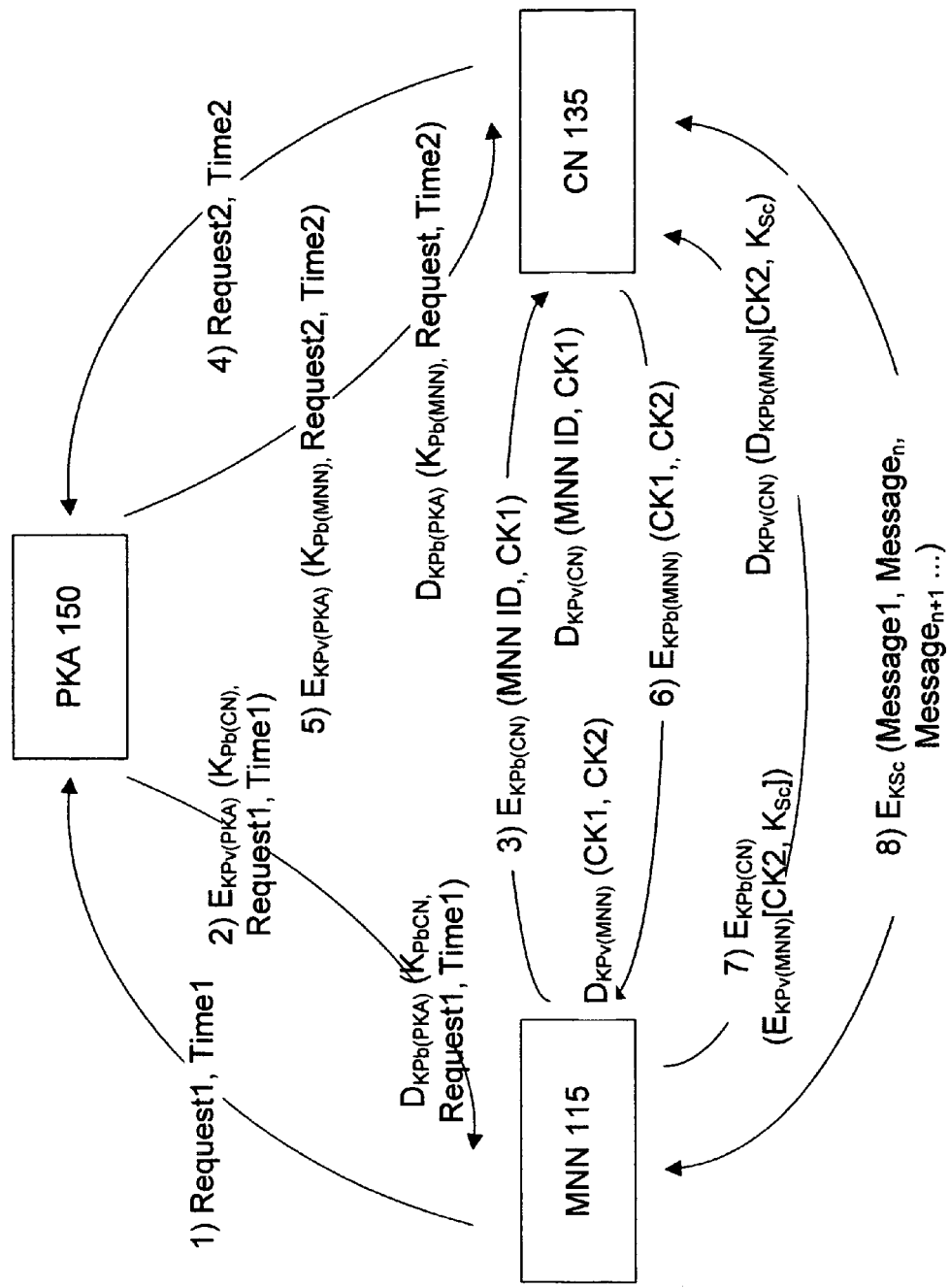
FIG. 2 is an example illustration of using PKI services to maintain a secure connection between the mobile network node and the other node.

FIG. 2 is an example illustration of MNN 115 and CN 135 using PKI services provided by PKA 150 to maintain a secure connection. FIG. 2 depicts the use of the PKI services in stages 1 through 6 for MNN 115 and CN 135 to authenticate each other. Stages 7 and 8 show how the nodes exchange the secret key.

In one example, as mentioned in FIG. 1A, both MNN 115 and CN 135 have registered with PKA 150 for PKI services. As part of those PKI services, MNN 115 and CN 135 each receive a unique private key (KPv) and a unique public key (KPb). In addition, each registered node receives PKA 150's unique public key. At stage 1, as portrayed in FIG. 2, MNN 115 sends a message to PKA 150 (e.g., via connection 105). The message may include a request to PKA 150 to receive CN 135's public key (Request1) as well as the time that the request was made (Time1).

At stage 2, in one example, PKA 150 responds to MNN 115's message by encrypting a response message that includes Request1 and Time1 as well as CN 135's public key. This response message is encrypted using PKA 150's private key ($E_{KPv(PKA)}$). The response message is received by MNN 115 (e.g., via connection 105) and MNN 115 decrypts the response message using PKA 150's public key ($D_{KPb(PKA)}$) and confirms that Request1 and Time1 match what it sent to PKA 150 in stage 1 to authenticate PKA 150.

At stage 3, in one example, MNN 115 sends a message to CN 135. This message includes an identifier (ID) to identify MNN 115 to CN 135. In addition, MNN 115 includes a random number cookie (CK1) for added security. Both the ID and CK1 are encrypted using CN 135's public key ($E_{KPb(CN)}$) and then sent to CN 135. CN 135 receives this message (e.g., via connection 105) and decrypts the message using its private key ($D_{KPv(CN)}$).

In stage 4, based on the ID that identifies the message sender as MNN 115 in stage 3, CN 135 sends a message to PKA 150. As portrayed in FIG. 2, CN 135 at Time2 sends the message to PKA 150 (e.g., via connection 105). The message includes a request to PKA 150 to receive MNN 115's public key (Request2) as well as the time that the request was made (Time2).

At stage 5, in one example, PKA 150 responds to CN 135's message by encrypting a response message that includes Request2 and Time2 as well as MNN 115's public key. This response message is encrypted using PKA 150's private key ($E_{KPv(PKA)}$). The response message is received by CN 115 (e.g., via connection 105) and CN 135 decrypts the response message using PKA 150's public key ($D_{KPb(PKA)}$) and confirms that Request2 and Time2 match what it sent to PKA 150 in stage 4 to authenticate PKA 150.

At stage 6, in one example, CN 135 sends a message to MNN 115 that includes CK1 that was received by CN 135 in stage 3 and its own random number cookie (CK2). This message is encrypted using MNN 115's public key ($E_{KPb(MNN)}$). The message is received by MNN 115 (e.g., via connection 105) and decrypted by MNN 115 using its private key ($D_{KPv(MNN)}$). MNN 115 confirms that CK1 matches the random number cookie it sent to CN 135 in stage 3 to authenticate CN 135.

At stage 7, in one example, based on CN 135's authentication, MNN 115 sends a message to CN 135 that includes CK2 and a secret key ($K_{Sc}$). CK2 and the secret key is first encrypted using MNN 115's private key ($E_{KPv(MNN)}$) and then the message is encrypted with CN 135's public key ($E_{KPb(CN)}$). The message is received by CN 135 (e.g., via connection 105) and decrypted by CN 135 using its private key ($D_{KPv(CN)}$) and then using MNN 115's public key ($D_{KPb(MNN)}$) to decrypt the portion of the message including CK2 and the secret key. CN 135 confirms that CK2 matches the random number cookie it sent to MNN 115 in stage 6 to authenticate MNN 115.

At stage 8, in one example, MNN 115 and CN 135 maintain a secure connection via an encryption scheme that includes the secret key exchanged in stage 7.

Figure 3:
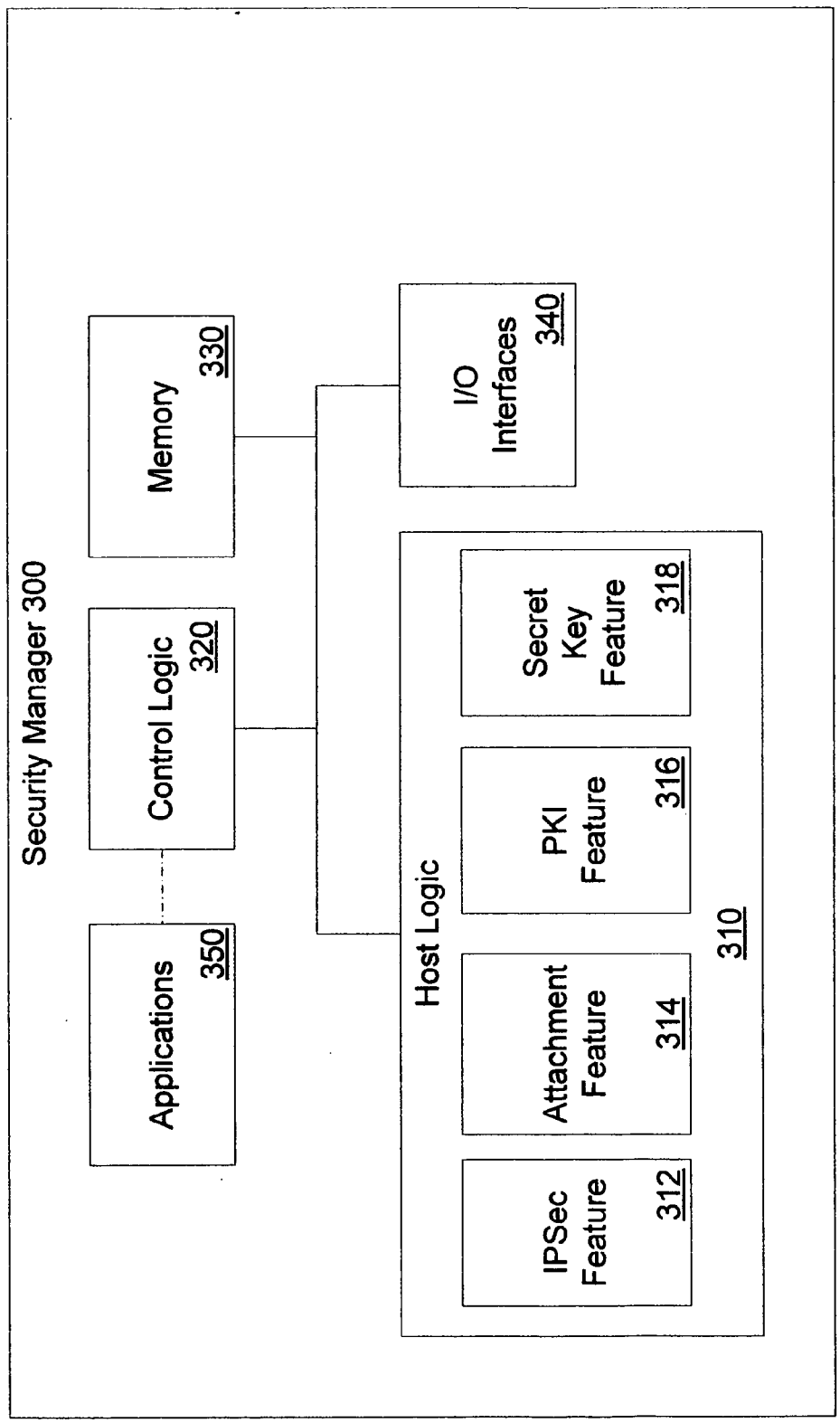
FIG. 3 is a block diagram of an example security manager architecture.

FIG. 3 is a block diagram of an example security manager 300 architecture. In FIG. 3, security manager 300 includes connection logic 310, control logic 320, memory 330, input/output (I/O) interfaces 340 and optionally one or more applications 350, each coupled as depicted.

In one example, the elements portrayed in FIG. 3's block diagram are node resources allocated to support or enable security manager 300 as described in this disclosure. For example, connection logic 310 and control logic 320 each or collectively represent any of a wide variety of logic device(s) or executable content a node (e.g., MNNs 113, 115, 117, CN 135, routers 112, 122, 132, 162, 164) allocates to implement a security manager 300. These logic device(s) may include a microprocessor, network processor, service processor, microcontroller, field programmable gate array (FPGA), application specific integrated circuit (ASIC), or executable content to implement such control features, or any combination thereof.

In FIG. 3, connection logic 310 includes IPSec feature 312, attachment feature 314, PKI feature 316 and secret key feature 318. In one implementation, connection logic 310 uses these features to establish and maintain a secure connection between mobile nodes on a network that couple to a network that may move or become mobile in an Internet based network (e.g., system 100).

Control logic 320 may control the overall operation of security manager 300 and as mentioned above, may represent any of a wide variety of logic device(s) or executable content to implement the control of security manager 300. In alternate examples, the features and functionality of control logic 320 are implemented within connection logic 310.

According to one example, memory 330 is used by connection logic 310 to temporarily store information. For example, information related to establishing and maintaining a secure connection between nodes (e.g., IPSec SADs, PKI public and private keys, random number cookies, etc.). Memory 330 may also store executable content. The executable content may be used by control logic 320 and/or connection logic 310 to implement or activate features or elements of security manager 300.

I/O interfaces 340 may provide an interface via a communication medium or link between security manager 300 and elements resident on a node or located remotely to the node (e.g., a PKI authority, network administrator, network manager, etc.). As a result, I/O interfaces 340 may enable configuration logic 310 or control logic 320 to receive a series of instructions from these elements. The series of instructions may activate connection logic 310 and/or control logic 320 to implement one or more features of security manager 300.

In one example, security manager 300 includes one or more applications 350 to provide internal instructions to control logic 320. Such applications 350 may be activated to generate a user interface, e.g., a graphical user interface (GUI), to enable administrative features, and the like. For example, a GUI provides a user access to memory 330 to modify or update information that security manager 300 uses to establish and maintain a secure connection between nodes.

Figure 4:
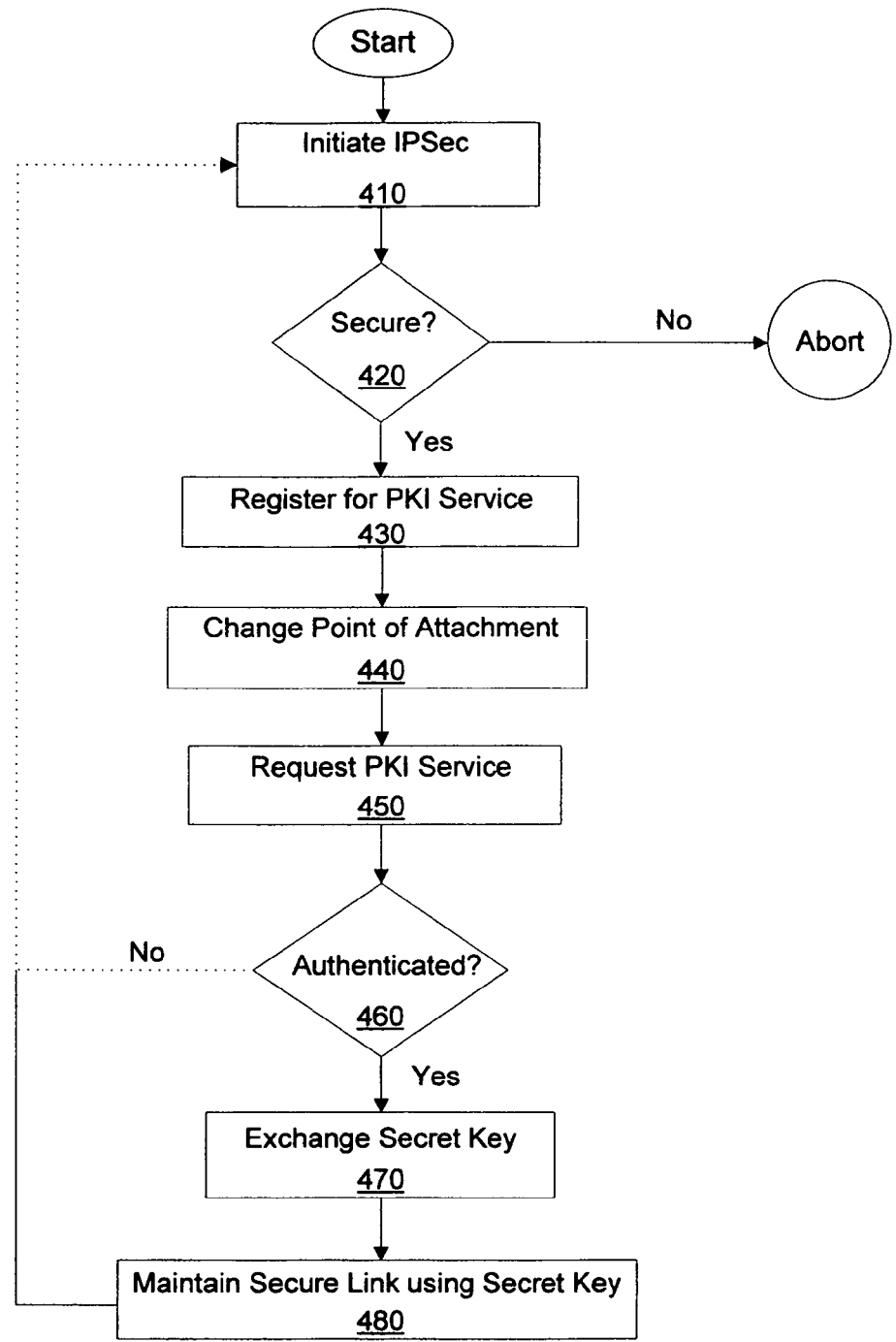
FIG. 4 is a flow chart of an example method to establish and maintain a secure connection.

FIG. 4 is a flow chart of an example method for MNN 115 to establish and maintain a secure connection with CN 135 in system 100 as portrayed in FIG. 1A. In one example, the method begins with MNN 115 in location 1. Thus, MNN 115 has a point of attachment to the Internet via router 112.

In block 410, in one example, connection logic 310 of security manager 300 in MNN 115 activates IPSec feature 312. IPSec feature 312, in one implementation, uses IPSec protocols described in RFC 3775 and/or RFC 3963 to initiate a secure connection with CN 135. This may include exchanging and synchronizing MNN 115's and CN 135's SAD(s).

In block 420, IPSec feature 312 determines whether the connection is secure, e.g., the SADs have been synchronized and MNN 115 and CN 135 have completed the actions to establish and maintain an IPSec-based secure connection. If the connection is not secure, the is method is aborted.

In block 430, in one example, if MNN 115 has not already registered for PKI services, connection logic 310 activates PKI feature 316. PKI feature 316 registers with PKA 150 to obtain PKI services for MNN 115. These services, as mentioned above, include a unique public and a unique private key for MNN 115. At least the private key, for example, is temporarily stored in memory 330. This registration may also establish a communication link between MNN 115 and PKA 150 such as connection 105 in FIG. 1A.

In block 440, in one example, connection logic 310 activates attachment feature 314. Attachment feature 314 monitors MNN 115's point of attachment to determine whether that point of attachment to the Internet changes. For example, as shown in FIG. 1A, MNN 115's movement to location 2 changes MNN 115's point of attachment from router 112 to router 122. This point of attachment change is detected, for example, based on MNN 115 changing its network address to an address that is part of domain 120 and/or associated with router 122.

In block 450, in one example, attachment feature 314 indicates to connection logic 310 that MNN 115's point of attachment has changed. Based on that change in point of attachment, PKI feature 316 makes a request via connection 105 to PKA 150. The request, as described for FIG. 2, includes the public key for CN 135 to begin the authentication of CN 135.

In block 460, in one example, PKI feature 460 uses the process described in stages 3 and 6 for FIG. 2 to authenticate CN 135. If CN 135 is not authenticated, in one example, MNN 115 initiates another IPSec secure connection. This would move the process back to block 410. In an alternative example, failure to authenticate CN 135 results in MNN 115 aborting the process and terminating secure communications with CN 135.

In block 470, in one example, PKI feature 316, based on an authenticated CN 135, exchanges a secret key with CN 135. PKI feature 316 at least temporarily stores the exchanged secret key in a memory (e.g., memory 330).

In block 480, in one example, connection logic 310 activates secret key feature 318. Secret key feature 318 obtains the secret key (e.g., from memory 330) and uses the secret key to maintain a secure connection. This may include implementing an encryption scheme that uses the secret key for symmetric encryption of data exchanged between MNN 115 and CN 135. The symmetric encryption to maintain a secure connection between MNN 115 and CN 135. Secret key feature 318 will continue to use the secret key for symmetric encryption to maintain a secure connection between MNN 115 and CN 135 even if MNN 115's point of attachment changes. For example, MNN 115 moves to any number of locations n with any number of point of attachments via routers n as portrayed in FIG. 1A.

In one example, the process starts again at block 410 should security manager 300 in MNN 115 determine that the secret key exchanged with CN 135 has been compromised, e.g., obtained by an entity other than MNN 115 or CN 135. In another example, the process starts again at block 410 if a timestamp expires that indicates a given life time that secret key can be used.

Referring again to the nodes in FIG. 1A and FIG. 1B (e.g., MNNs 113, 115 and 117, routers 112, 122, 132, 162, 164 and n, PKA 150). In one example, these nodes may include transceivers (not shown) that include one or more antennas to transmit and receive data between nodes or elements interconnected and located on networks coupled to the Internet. These antennas may include, for example, an internal and/or external RF antenna. In one example, these transceivers may include a dipole antenna, a monopole antenna, an omni-directional antenna, an end fed antenna, a circularly polarized antenna, a micro-strip antenna, a diversity antenna, or any other type of antenna suitable for sending and/or receiving wireless signals, blocks, frames, data items, transmission streams, packets, messages or data.

In one example, a node's transceiver also includes circuitry or logic to process and/or forward data via wireless communication links. This circuitry or logic includes, but is not limited to, one or more radios, network interfaces, digital signal processors, etc.

Referring again to memory 330 in FIG.3. Memory 330 may include a wide variety of memory media including but not limited to volatile memory, non-volatile memory, flash, programmable variables or states, random access memory (RAM), read-only memory (ROM), flash, or other static or dynamic storage media. In one example, machine-readable instructions can be provided to memory 330 from a form of machine-accessible medium. A machine-accessible medium may, for example, represent a storage medium including any mechanism that provides (i.e., stores) information or content in a form readable by a machine (e.g., an ASIC, special function controller or processor, FPGA, router, node or other hardware device). For example, a machine-accessible storage medium may include: ROM; RAM; magnetic disk storage media; optical storage media; flash memory devices; and the like.

References made in the specification to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in this regard.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

What is claimed is:

1. In a first node, a method comprising:
    establishing a secure connection via an Internet with a second node that couples to the Internet, the secure connection established with an Internet Protocol Security (IPsec) security association;
    registering the first node with an authority that couples to the Internet and provides public key infrastructure (PKI) services, wherein the first node obtains both a private key and a public key, wherein the PKI services include:
        providing the private key to only the first node, and when the second node is registered with the authority, providing the public key to the second node;
    after the secure connection is established, determining that the first node has changed from communicating via a first point of attachment to the Internet to communicating via a second point of attachment to the Internet;
    in response to the determining that the first node has changed from communicating via the first point of attachment to the Internet to communicating via the second point of attachment to the Internet, sending a request for one of the PKI services from the authority to determine whether the second node is authenticated;
    where the requested PKI service communicates to the first node that the second node is not authenticated, initiating another IPsec secure connection from the first node to the second node; and
    where the requested PKI service communicates to the first node that the second node is authenticated:
        exchanging a secret key with the second node; and
        without reestablishing or maintaining the secure connection established with the IPsec security association, implementing an encryption scheme that uses the exchanged secret key for symmetric encryption of data exchanged between the first node and the second node, the symmetric encryption to maintain secure communication between the first and second nodes.

2. A method according to claim 1, wherein the IPSec security association further comprises:
    exchanging with the second node a list of encryption standards and encryptions algorithms to use with the encryption standards; and
    synchronizing the list to determine common encryption algorithms to use with the common encryption standards.

3. A method according to claim 2, wherein the encryption standards include one of Advanced Encryption Standard (AES), Data Encryption Standard (DES) and Triple Data Encryption Standard (3DES).

4. A method according to claim 3, wherein the encryption algorithms include one of Cipher Block Chaining (CBC), Counter Mode Encryption with CBC-Media Access Controller authentication (CCM), and Electric Code Book (ECB).

5. A method according to claim 1, wherein the authority comprises an Internet service provider.

6. A method according to claim 1, wherein the first node, the second node and the authority are on different local area networks that couple to the Internet.

7. A method according to claim 1, wherein the first point of attachment to the Internet comprises a router for a network that couples to the Internet, wherein the determining that the first node has changed from communicating via the first point of attachment to the Internet to communicating via the second point of attachment to the Internet includes detecting a change in a network address associated with the first node, the change in the network address to include another network address, the other network address associated with a domain for another router coupled to a network that couples to the Internet.

8. A method according to claim 7, wherein the first node changes from communicating via the first point of attachment to the Internet to communicating via a second point of attachment to the Internet based on the first node physically moving.

9. A method according to claim 7, the first node to include wireless capabilities to couple to the router and the other router, wherein the point of attachment is to change based on the first node receiving a more powerful wireless signal from the other router.

10. A method according to claim 7, wherein the router and the other router are on different local area networks.

11. A method according to claim 1, wherein authenticating the second node via the PKI services further includes:
forwarding a message to the second node, the message to include a random number cookie encrypted using the second node's public key;
receiving a response to the message from the second node, the response to include the random number cookie encrypted with the first node's public key;
decrypting the response with the first node's private key; and
authenticating the second node based on the decrypted response including the random number cookie.

12. A method according to claim 1, wherein the authority, the first node and the second node communicate based on one of Mobile Internet Protocol Version 6 (MIPv6) or Mobile Internet Protocol Version 4 (MIPv4).

13. An apparatus comprising:
a first node to couple to an Internet, the first node including logic to:
establish a secure connection via the Internet with a second node coupled to the Internet, the secure connection established with an Internet Protocol Security (IPsec) security association;
register the first node with an authority that couples to the Internet and provides public key infrastructure (PKI) services, wherein the first node obtains both a private key and a public key, wherein the PKI services include:
providing the private key to only the first node, and
when the second node is registered with the authority, providing the public key to the second node;
determine, after the secure connection is established, that the first node has changed from communicating via a first point of attachment to the Internet to communicating via a second point of attachment to the Internet;
in response to the determining that the first node has changed from communicating via the first point of attachment to the Internet to communicating via the second point of attachment to the Internet, send a request for one of the PKI services from the authority to determine whether the second node is authenticated;
where the requested PKI service communicates to the first node that the second node is not authenticated, initiate another IPsec secure connection from the first node to the second node; and
where the requested PKI service communicates to the first node that the second node is authenticated:
exchange a secret key with the second node based on the authentication of the second node; and
implement, without reestablishing or maintaining the secure connection established with the IPsec security association, an encryption scheme that uses the exchanged secret key for symmetric encryption of data exchanged between the first node and the second node, the symmetric encryption to maintain secure communication between the first and second nodes.

14. An apparatus according to claim 13, wherein the IPSec security association further comprises the logic to:
exchange with the second node a list of encryption standards and encryptions algorithms to use with the encryption standards; and
synchronize the list to determine common encryption algorithms to use with the common encryption standards.

15. An apparatus according to claim 13, the first point of attachment to the Internet to comprise a router for a network that couples to the Internet, wherein the determining that the first node has changed from communicating via the first point of attachment to the Internet to communicating via the second point of attachment to the Internet includes detecting a change in a network address associated with the first node, the change in the network address to include another network address, the other network address associated with a domain for another router coupled to a network that couples to the Internet.

16. An apparatus according to claim 15, wherein the first node changes from communicating via the first point of attachment to the Internet to communicating via a second point of attachment to the Internet based on the first node physically moving.

17. An apparatus according to claim 15, the first node to include wireless capabilities to couple to the router and the other router, wherein the point of attachment is to change based on the first node detecting a more powerful wireless signal from the other router.

18. An apparatus according to claim 15, wherein the router and the other router are coupled to the same local area network.

19. A system comprising:
an authority on a network coupled to an Internet, the authority to provide Public Key Infrastructure (PKI) services to nodes that register with the authority for PKI services;
a first node to couple to the Internet, the first node including logic to:
establish a secure connection via the Internet with a second node coupled to the Internet, the secure connection established with an Internet Protocol Security (IPsec) security association;
register the first node with the authority, wherein the first node obtains both a private key and a public key, wherein the PKI services include:
providing the private key to only the first node, and
when the second node is registered with the authority, providing the public key to the second node;
determine, after the secure connection is established, that the first node has changed from communicating via a first point of attachment to the Internet to communicating via a second point of attachment to the Internet;
request the PKI services from the authority to determine whether the second node is authenticated, the requesting based on a change in a point of attachment for the node to the Internet;
where the requested PKI service communicates to the first node that the second node is not authenticated, initiate another IPsec secure connection from the first node to the second node;
where the requested PKI service communicates to the first node that the second node is authenticated:
exchange a secret key with the second node based on the authentication of the other node; and
implement, without reestablishing or maintaining the secure connection established with the IPsec security association, an encryption scheme that uses the exchanged secret key for symmetric encryption of data exchanged between the first node and the second node, the symmetric encryption to maintain secure communication between the first and second nodes.

20. A system according to claim 19, wherein the IPSec security association further comprises the logic to:
exchange with the second node a list of encryption standards and encryptions algorithms to use with the encryption standards; and
synchronize the list to determine common encryption algorithms to use with the common encryption standards.

21. A system according to claim 19, the first point of attachment to the Internet to comprise a router for a network that couples to the Internet, wherein the determining that the first node has changed from communicating via the first point of attachment to the Internet to communicating via the second point of attachment to the Internet includes detecting a change in a network address associated with the first node, the change in the network address to another network address, the other network address associated with a domain for another router coupled to a network that couples to the Internet.

22. A system according to claim 21, wherein the first node changes from communicating via the first point of attachment to the Internet to communicating via a second point of attachment to the Internet based on the first node physically moving.

23. A system according to claim 21, the first node to include wireless capabilities to couple to the router and the other router, wherein the point of attachment is to change based on the first node detecting a more powerful wireless signal from the other router.

24. A system according to claim 21, wherein the router and the other router are coupled to the same wireless local area network.

25. A system according to claim 19, wherein the authority, the first node and the second node communicate based on one of Mobile Internet Protocol Version 6 (MIPv6) or Mobile Internet Protocol Version 4 (MIPv4).

26. A non-transitory machine-accessible storage medium comprising content, which, when executed by a machine causes a first node to:
establish a secure connection via an Internet with a second node coupled to the Internet, the secure connection established with an Internet Protocol Security (IPsec) security association;
register the first node with an authority that couples to the Internet and provides public key infrastructure (PKI) services, wherein the first node obtains both a private key and a public key, wherein the PKI services include:
providing the private key to only the first node, and when the second node is registered with the authority, providing the public key to the second node;
determine, after the secure connection is established, that the first node has changed from communicating via a first point of attachment to the Internet to communicating via a second point of attachment to the Internet;
in response to the determining that the first node has changed from communicating via the first point of attachment to the Internet to communicating via the second point of attachment to the Internet, send a request for one of the PKI services from the authority to determine whether the second node is authenticated;
where the requested PKI service communicates to the first node that the second node is not authenticated, initiate another IPsec secure connection from the first node to the second node;
where the requested PKI service communicates to the first node that the second node is authenticated:
exchange a secret key with the second node based on the authentication of the second node; and
implement, without reestablishing or maintaining the secure connection established with the IPsec security association, an encryption scheme that uses the exchanged secret key for symmetric encryption of data exchanged between the first node and the second node, the symmetric encryption to maintain secure communication between the first and second nodes.

27. A non-transitory machine-accessible storage medium according to claim 26, wherein the IPSec security association further includes the first node to:
exchange with the second node a list of encryption standards and encryptions algorithms to use with the encryption standards; and
synchronize the list to determine common encryption algorithms to use with the common encryption standards.

28. A non-transitory machine-accessible storage medium according to claim 26, wherein to authenticate the second node via the PKI services further includes the first node to:
forward a message to the second node, the message to include a random number cookie encrypted using the second node's public key;
receive a response to the message from the second node, the response to include the random number cookie encrypted with the first node's public key; decrypt the response with the first node's private key; and
authenticate the second node based on the decrypted response including the random number cookie.

* * * * *